May 3, 1966   I. H. SCHEIMAN   3,248,915
HUB CAP AND TIRE LOCK
Filed May 6, 1964   2 Sheets-Sheet 1
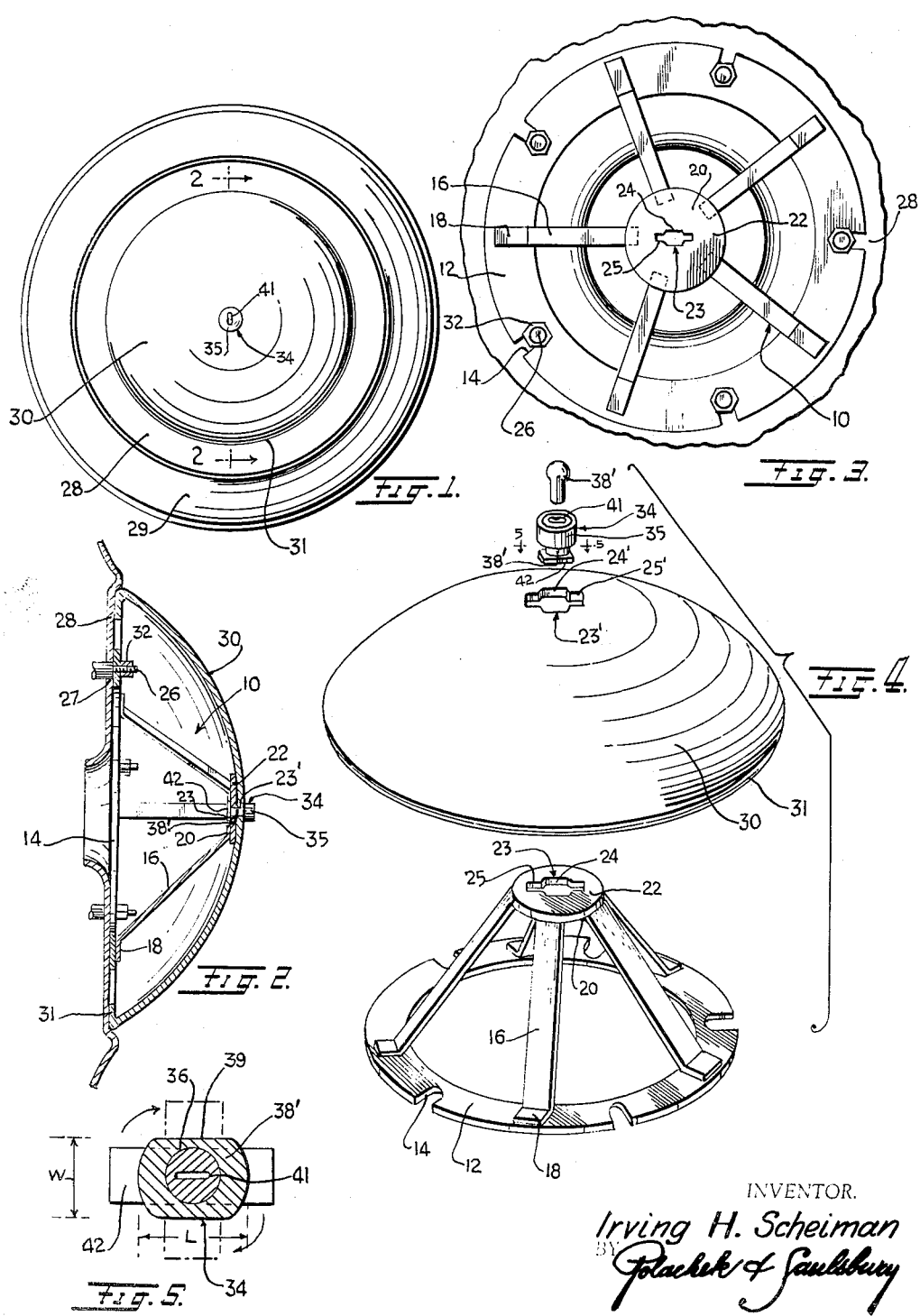
INVENTOR.
Irving H. Scheiman
BY Polachek & Saulsbury
ATTORNEYS

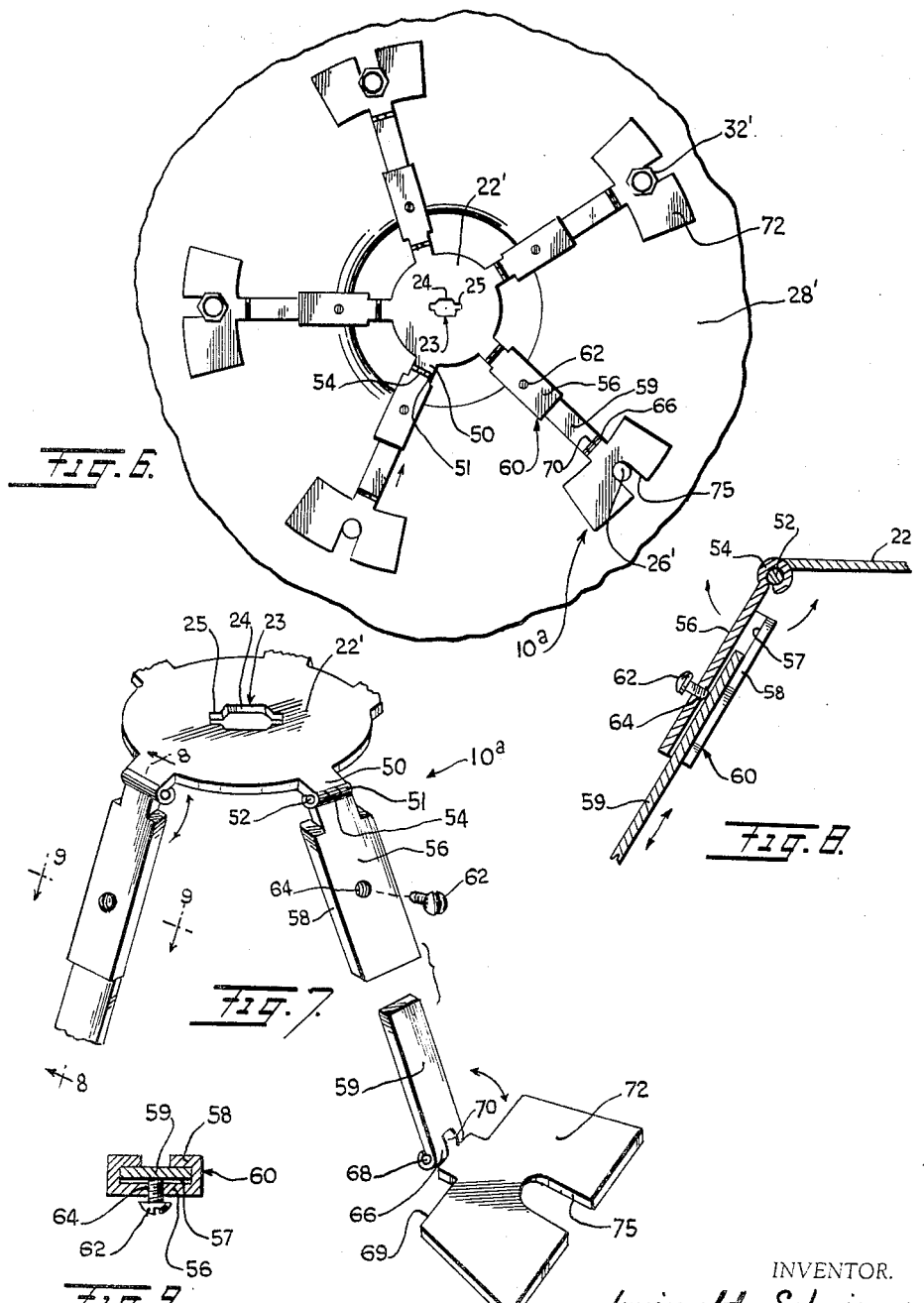

United States Patent Office 3,248,915
Patented May 3, 1966

1

3,248,915
HUB CAP AND TIRE LOCK
Irving H. Scheiman, 1935 Shore Parkway, Brooklyn, N.Y.
Filed May 6, 1964, Ser. No. 365,351
4 Claims. (Cl. 70—168)

This invention is directed at a locking device for preventing accidental loss or theft of a hub cap and wheel of an automotive vehicle.

Various expedients have been proposed heretofore directed at preventing accidental loss, theft, or unauthorized removal of hub caps and wheels. Generally the prior devices have had complex structures which required material alteration of the hub caps, wheels or hubs of vehicles so as to preclude their use in vehicles of conventional design. Difficulties have also been encountered with wheel and axle vibration and uneven tire wear due to unbalanced structures of prior wheel locking devices.

The present invention is directed to overcoming the above and other difficulties and disadvantages in providing a novel, symmetrical bracket including a notched ring which can be installed on a wheel of a vehicle to be held by the usual nuts or bolts thereat. The bracket has a circular flange connected to the ring by a plurality of arms. The flange abuts the underside or inner side of a hub cap. Registering holes are provided in the hub and flange. A lock can be inserted into the registering holes so that radially extending dogs on the lock can be turned to engage behind the flange for securely locking the hub on the bracket. Another form of the device can be mounted on wheels of various sizes carrying wheel hubs of different depths. This is made possible by a plurality of hinged spider arms attached to the flange with hinged locking plates at ends of the arms. The arms have a two-part telescopic structure. The flange arms and plates can be flattened out for convenience in shipment and storage and can readily be set up and installed on a wheel of any size.

It is therefore one object of the invention to provide a device which is effective for preventing accidental loss, theft or unauthorized removal of a hub cap and wheel of an automotive vehicle.

A further object is to provide a device of the character described including a circular flange adapted to abut the inner side of a hub cap of a wheel, the flange having a noncircular hole for registering with a similar hole in the hub cap to receive dogs of a lock cylinder, arms radially connected to the flange, and a locking plate or plates at ends of the arms engageable by nuts or bolts on the wheel of the vehicle.

Another object is to provide a device of the character described adaptable to fit on wheels of different diameters carrying hub caps of various depths, said device including a circular flange, a plurality of arms hinged to the flange, and locking plates hinged to the arms, each of the arms including a pair of telescopically secured members.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a device embodying the invention, shown mounted on a wheel.

FIG. 2 is a fragmentary sectional view taken on line 2—2 of FIG. 1.

FIG. 3 is an enlarged side view of the device on a wheel, with parts of the wheel and hub cap removed.

FIG. 4 is an exploded perspective view of parts of the device.

2

FIG. 5 is an enlarged sectional view taken on line 5—5 of FIG. 4, through the lock of the device.

FIG. 6 is a side view of another device embodying the invention, shown mounted on a wheel, with parts of the wheel and hub cap removed.

FIG. 7 is an enlarged perspective partially exploded view of the device of FIG. 6, parts being broken away.

FIG. 8 and FIG. 9 are enlarged sectional views taken on lines 8—8 and 9—9, respectively, of FIG. 7.

Referring first to FIGS. 1–5, there is shown the device 10 including a flat annular ring 12 having five circumferentially spaced notches 14 extending inwardly from the outer periphery of the ring. Five straight arms 16 have radially outwardly bent feet 18 secured by welding or other suitable fastening means to the ring at points midway between notches 14. The arms extend axially upward of the ring and are inclined inwardly toward the central axis of the ring. Upper ends 20 of the arms are bent inwardly and are secured to the underside of a circular flange 22 at its periphery. The plane of flange 22 is parallel to the plane of ring 12. The flange has a central elongated hole 23 with straight parallel side edges 24 and notches 25 at its opposite ends.

The several notches 14 will receive threaded bolts or studs 26 which extend outwardly of a brake drum (not shown) of a vehicle. The bolts pass through holes 27 in the outer side of wheel drum 28. The wheel drum 28 has a conventional structure. A pneumatic tire 29 is mounted thereon as shown in FIG. 1. Nuts 32 are engaged upon the several bolts as shown in FIGS. 2 and 3 to hold the ring securely to the wheel. The flange 22 and arms 16 define a generally conical or flaring spider structure between the ring and adjacent hub cap 30.

The hub cap has its concave side facing the wheel drum 28 and its periphery 31 bears on the outer face of the wheel drum. The center of the inner side of the hub cap abuts the flange 22. An elongated hole 23' is formed in the center of the hub cap. This hole is identical in size and shape to and registers with hole 23 in flange 22.

A lock 34 having a cylindrical body 35 larger than the width of holes 23 and 23' is provided to lock the flange and hub cap together. This lock has a cylinder 36 axially rotatable by a key 38 in the body 35 of the lock. The body 35 has an extension 38' with flat sides 39. The width W of the lock extension 38' (see FIG. 5) is equal to the width of holes 23 and 23'. The transverse length L of the lock extension is equal to the length of side edges 24, 24' of holes 23, 23'. The axial length of the extension 38' is equal to the combined thicknesses of the hub cap center and flange 22. Secured at the end of cylinder 36 is a crossbar 42 disposed perpendicularly to the axis of cylinder 36. Ends of bar 42 pass through notches 25, 25' when the lock extension is inserted in holes 23, 23'. When key 38 is inserted in keyhole 41 of cylinder 36 and is turned 90° the crossbar 42 is turned perpendicularly to edges 24, 24' so that its ends underlap the underside or inner side of flange 22. The key can then be removed, leaving the hub cap and flange 22 locked to each other, with the body 35 of the lock bearing on the outside center of the hub cap. The hub cap will thus be held securely and will not be accidentally lost. It cannot be removed by any unauthorized person nor can it be stolen.

The nuts 32 are concealed and enclosed within the hub cap and cannot be removed unless the lock is opened to remove the hub cap. Thus the wheel also is protected against unauthorized removal. If desired the key 38 can be the same as the one which operates the ignition of the vehicle. Four identical locks 34 will then be provided for the four wheels of the vehicle.

FIGS. 6–9 show another protective device 10a which is similar to device 10 and corresponding parts are identically numbered. Device 10a is adapted for mounting on a wheel whose studs or bolts have a spacing in a predetermined range of sizes and whose hub cap has an axial depth in a predetermined range of lengths. The device 10a can thus serve for a large number of wheels and hub caps of different sizes.

Device 10a has circular flange 22' provided with an elongated hole 23 like flange 22, to receive lock 34 through hole 23' in a hub cap 30. Flange 22' has five short radial fingers 50 with tubular hinge elements 51 at their ends. Pivotally secured to hinge elements 51 by hinge pins 52 are tubular hinge elements 54 at the upper ends of arm members 56. Each arm member has a pair of inwardly extending flanges 58 at its edges defining a channel 57 in which is telescopically and slidably engaged a lower or outer arm member 59. Together the arm members 56 and 59 define telescopically adjustable arms 60. The flange 22' has five such adjustable arms 60 circumferentially spaced around the flange. Screws 62 are screwed in threaded holes 64 in the outer sides of arm members 56 to secure the lower arm members 59 in position in the upper arm members.

The lower end of each arm member 56 is formed with tubular hinge elements 66 which are engaged by hinge pins 68 with hinge elements 70 extending inwardly from edges 69 of generally rectangular lock plates 72. Each of the lock plates has a notch 75 extending inwardly from outer edge 73. These notches receive bolts 26' and nuts 32' engaged on the bolts for securing the several plates 72 to the wheel drum 28' as shown in FIG. 6.

It will be apparent that the lock plates can be disposed at studs or bolts 26' having any of a number of different spacings circumferentially and radially of the wheel drum. The arms 60 can be extended or contracted to accommodate the lock plates precisely to the spacing of the bolts 26'. Furthermore, the spacing of the flange 22' from the lock plates and wheel can be varied so that the flange 22 will abut the inner side of the hub cap regardless of its axial depth, within a predetermined range of hub cap sizes. The hinge attachments of the arms at opposite ends insure that the flange 22' will remain parallel to the lock plates and permit axial and radial variations in size of the device 10a.

The device 10a can assume a wholly flat configuration when off the wheel so that it can be packed and stored in a minimum of space. Four such devices 10a when packed flat will fit into a shallow box for convenience in storage and shipment. Four devices 10a will be sufficient to equip any automobile with theft-proof means for all four wheels. The adjustable devices 10a make it possible to minimize the variety of sizes that dealers and distributors must stock to equip substantially all the types of present-day mass produced automobiles with theft-proof devices.

The devices 10, 10a are inexpensively manufactured. They are durable and long-lasting; easy to attach and remove; and almost invisible when properly installed.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A locking device for a wheel on a vehicle, wherein said wheel has a side secured by circumferentially spaced threaded members to a brake drum of the vehicle, comprising a plurality of flat plates having notches engageable by the threaded members respectively in a plane for holding said plates securely against said side of the wheel, a plurality of arms secured at one end to the plates respectively, said arms extending outwardly from plates and inclined inwardly toward each other, a circular flange secured to other ends of said arms and held in a position parallel to said plates, said flange having a central elongated hole therein, a dished hub cap having another centrally located hole disposable in registration with the hole in the flange with the flange abutting the inner side of the hub cap and with the periphery of the hub cap abutting said side of the wheel, whereby a lock may be mounted at the outside of said hub cap at its center with a portion of a lock cylinder extending through the registering holes with a radial lock member engaging the flange when the lock cylinder is turned by a key, so that the hub cap is locked to the wheel with the threaded members concealed to prevent unauthorized removal of the hub cap and wheel, each of said arms including two telescopically connected arm members, one of said arm members being channel-shaped, the other slidable therethrough for lengthening and shortening each arm, and screw means for fixing the arm members together so that each arm has a fixed length, whereby the distance between said flange and said plates is variable by adjusting the lengths of the arms.

2. A locking device for a wheel on a vehicle, wherein said wheel has a side secured by circumferentially spaced threaded members to a brake drum of the vehicle, comprising a plurality of flat plates having notches engageable by the threaded members respectively in a plane for holding said plates securely against said side of the wheel, a plurality of arms secured at one end to the plates respectively, said arms extending outwardly from plates and inclined inwardly toward each other, a circular flange secured to other ends of said arms and held in a position parallel to said plates, said flange having a central elongated hole therein, a dished hub cap having another centrally located hole disposable in registration with the hole in the flange with the flange abutting the inner side of the hub cap and with the periphery of the hub cap abutting said side of the wheel, whereby a lock may be mounted at the outside of said hub cap at its center with a portion of a lock cylinder extending through the registering holes with a radial lock member engaging the flange when the lock cylinder is turned by a key, so that the hub cap is locked to the wheel with the threaded members concealed to prevent unauthorized removal of the hub cap and wheel, each of said arms including two telescopically connected arm members, said arm members being slidably adjustable for lengthening and shortening each arm, means for fixing the arm members together so that each arm has a fixed length, whereby the distance between said flange and said plates is variable by adjusting the lengths of the arms, hinge means at the one end of each arm and on the periphery of said flange whereby the arms are pivotal with respect to said flange, and other hinge means at the other end of each arm and on an inner edge of said plates, whereby said flange remains parallel to each of said plates in all angular positions of said arms with respect to said flange and said plates and in all positions of extension of said arms.

3. A locking device for a wheel on a vehicle, wherein said wheel has a side secured by circumferentially spaced threaded members to a brake drum of the vehicle, comprising a plurality of flat plates having notches engageable by the threaded members respectively in a plane for holding said plates securely against said side of the wheel, a plurality of arms secured at one end to the plates respectively, said arms extending outwardly from plates and inclined inwardly toward each other, a circular flange secured to other ends of said arms and held in a position parallel to said plates, said flange having a central elongated hole therein, a dished hub cap having another centrally located hole disposable in registration with the hole in the flange with the flange abutting the inner side of the hub cap and with the periphery of the hub cap abutting said side of the wheel, and a lock having a cylindrical body abutting the outside of the hub cap at its center, said lock having a cylinder axially rotatable by a key, said body having an extension inserted through the registering holes, said cylinder having a cross-bar extending radially outwardly thereof at its end beyond said extension and engaged on the inner side of said flange, whereby the hub cap is locked to the wheel with the threaded members concealed to prevent unauthorized removal of the hub cap and wheel, each of said arms including two telescopically connected arm members, one of said arm members being channel-shaped, the other slidable therethrough for lengthening and shortening each arm, and screw means for fixing the arm members together so that each arm has a fixed length, whereby the distance between said flange and said plates is variable by adjusting the lengths of the arms.

4. A locking device for a wheel on a vehicle, wherein said wheel has a side secured by circumferentially spaced threaded members to a brake drum of the vehicle, comprising a plurality of flat plates having notches engageable by the threaded members respectively in a plane for holding said plates securely against said side of the wheel, a plurality of arms secured at one end to the plates respectively, said arms extending outwardly from the plates and inclined inwardly toward each other, a circular flange secured to other ends of said arms and held in a position parallel to said plates, said flange having a central elongated hole therein, a dished hub cap having another centrally located hole disposable in registration with the hole in the flange with the flange abutting the inner side of the hub cap and with the periphery of the hub cap abutting said side of the wheel, and a lock having a cylindrical body abutting the outside of the hub cap at its center, said lock having a cylinder axially rotatable by a key, said body having an extension inserted through the registering holes, said cylinder having a cross-bar extending radially outwardly thereof at its end beyond said extension and engaged on the inner side of said flange, whereby the hub cap is locked to the wheel with the threaded members concealed to prevent unauthorized removal of the hub cap and wheel, each of said arms including two telescopically connected arm members, said arm members being slidably adjustable for lengthening and shortening each arm, means for fixing the arm members together so that each arm has a fixed length, whereby the distance between said flange and said plates is variable by adjusting the lengths of the arms, hinge means at the one end of each arm and on the periphery of said flange whereby the arms are pivotal with respect to said flange, and other hinge means at the other end of each arm and on an inner edge of said plates, whereby said flange remains parallel to each of said plates in all angular positions of said arms with respect to said flange and said plates and in all positions of extension of said arms.

References Cited by the Examiner

UNITED STATES PATENTS

| | | | |
|---|---|---|---|
| 2,315,963 | 4/1943 | Jandus | 70—232 |
| 2,493,366 | 1/1950 | Simcich | 70—259 X |
| 2,535,126 | 12/1950 | Flowers et al. | 70—169 |
| 2,594,407 | 4/1952 | Earnest | 70—169 |
| 2,722,822 | 11/1955 | Thomas | 20—167 |
| 2,847,096 | 9/1958 | Lyon. | |

FOREIGN PATENTS 791,863   3/1958   Great Britain.

JOSEPH D. SEERS, *Primary Examiner.*

BOBBY R. GRAY, *Examiner.*